Sept. 10, 1929.  R. MEIJER  1,728,069
MEANS FOR CUTTING PIPES IN WELL HOLES
Filed Nov. 17, 1927

Inventor:
R. Meijer.
By Lanjur, Parry, Card & Langmur
Attys.

Patented Sept. 10, 1929.

1,728,069

UNITED STATES PATENT OFFICE.

REINIER MEIJER, OF VOORSCHOTEN, NETHERLANDS, ASSIGNOR TO NAAMLOOZE VENNOOTSCHAP: DE BATAAFSCHE PETROLEUM MAATSCHAPPIJ OF THE HAGUE, NETHERLANDS.

MEANS FOR CUTTING PIPES IN WELLHOLES.

Application filed November 17, 1927, Serial No. 234,008, and in the Netherlands September 29, 1927.

My present invention relates to means for cutting pipes in well-holes.

Briefly stated, an important object of my invention is a device of this character which within certain practical limits allows the cutter, or cutters, to remain within the groove already cut when the length of the stem or the pipe through which the cutters are rotated is reduced or increased.

Another object of my invention is a device in which the cutter is or the cutters are retracted out of contact with the pipe to be cut when the member for feeding the cutters descends.

Still another object of my invention is a device for cutting pipes in deep wells which is of simplified construction and reliable in use.

Other objects and advantages of the invention will be apparent during the course of the following description.

Figure 1:
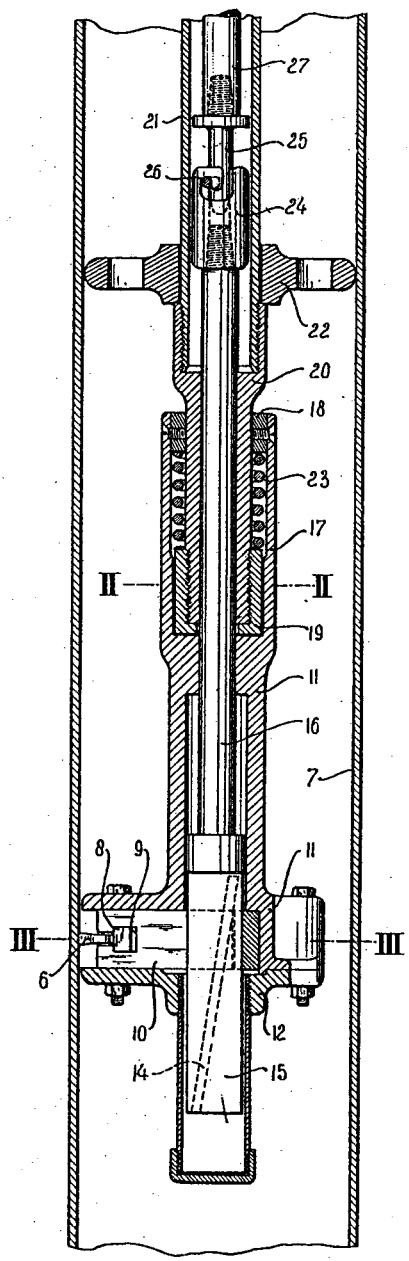
Figure 2:
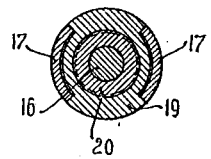
Figure 3:
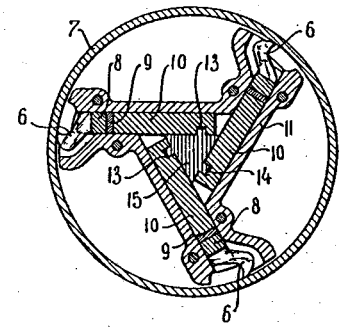

In the accompanying more or less diagrammatic drawing forming a part of this specification and in which like numerals are employed to designate like parts throughout the same, Fig. 1 is a vertical sectional view through a device according to my invention, placed within the pipe to be cut off, Fig. 2 is a cross sectional view taken along the line II—II in Fig. 1, Fig. 3 is a cross sectional view taken along the line III—III in Fig. 1.

The device illustrated is provided with three cutters 6 cooperating to cut a circumferential groove in the pipe 7 until the latter has been cut off or weakened to an extent as to permit its upper portion to be drawn out of the well-hole.

By means of a butt 8 and a key 9 each cutter is secured to a holder 10 adapted for horizontal reciprocation in a two-part casing 11, 12. Each holder is provided with an inclined groove 13 engaging a fin or key 14 projecting from each lateral face of the triangular cutter feed block 15. Said block 15 is integral with a feed rod 16 mounted for vertical sliding motion within casing 11, 12. Since the block 15 is splined to the cutter holders 10, it is obviously prevented from rotary motion within said casing.

Casing 11 is reduced to define an annular extension on the upper portion and this extension is provided with two wide longitudinal recesses, thus forming two lips 17 which by means of screws are secured to a guide ring 18. The lips 17 serve to guide a clutch 19, which is screwed on a suspension piece 20 secured to the hollow turn rod 21 having a guide member 22 keyed thereto. Interposed between clutch 19 and ring 18 is a coiled spring 23 having a certain amount of initial tension.

The feed rod 16 is fitted with a head 24 having a bayonet slot therein coacting with a stud 25 provided with a cross-pin 26, said stud being screwed into a stem 27 which, as well as the hollow turn rod 21, may be composed of a plurality of sections and which projects from the well-hole above the surface of the ground.

Above the surface of the ground, the turn rod 21 is rotatably suspended and the feed stem 27 is associated therewith so as to have freedom of vertical movement but to be prevented from rotation relative thereto, in a manner well understood in this art. Before mounting this "rotary," it is, of course, necessary to run in the feed stem 27 with the stud 25 and to turn said stem until the cross pin 26 is in operative engagement in the bayonet slot of the head 24.

When the feed rod 16 assumes its lowermost position relative to the casing 11, 12, the cutters 6 are fully retracted and out of engagement with the pipe to be cut off. In operation, the casing 11, 12 is rotated by means of the turn rod 21 and the feed block 15 is raised little by little, whereby the cutters are urged outwards so as to cut the required groove.

Should the resistance to the turning of the cutting tool exceed a certain value, the screw couplings between the sections of the turn rod 21 will be tightened due to the opposing forces imposed at the opposite ends of the rod and the length of the turn rod thereby reduced, so that the cutters tend to rise. However, the presence of the spring 23 between the turn rod 21 and the casing 11. 12 prevents the cutters from becoming fractured and allows them to remain within the groove already cut.

In order to prevent excessive torque from being applied to the feed stem 27 when the screw couplings between the sections of the turn rod are tightened, said stem may be equipped with a swivel.

When the cutting device is lowered into a drill pipe within which another temperature prevails than in the atmosphere, the length of the turn rod is affected thereby. Generally, the temperature in the pipe will exceed that of the atmosphere so that the turn rod tends to expand, and it is therefore desirable not to start the cutting operation before the turn rod has substantially assumed the temperature of the well. In lieu of one spring 23, I may provide two oppositely acting springs for keeping the casing 11 "floating," so that neither an elongation, nor a shortening of the turn rod can, within certain limits, interfere with the proper position of the cutters. In the device illustrated by way of example, the cutters will descend through a short distance and thereby widen the groove if during the cutting operation the temperature of the turn rod increases.

When the cutting operation is started at a moment when the turn rod has not yet fully assumed the temperature of the well so that it can still expand a little, the heat will still be transmitted to the feed stem which, consequently, expands during the operation. This will cause the cutters to be retracted through a certain distance, so that they will widen the groove without simultaneously deepening it, whereby the load on the cutters remains within suitable limits. Should the feed stem break, the consequential downward motion of the feed block 15 causes the cutters to be retracted, so that the device can be removed from the well.

From the above it follows that an important feature of my invention is the co-operation between the feed member and the cutters so that the said member must be raised in order that the cutters may be moved outward. Obviously, the triangular feed block 15 as used in the illustrated embodiment of my invention could be replaced, inter alia, by a truncated cone suspended from the feed rod and having its conical surface in engagement with the rear or inner ends of cutter holders loaded by springs for urging them to their inward positions when the cone descends. This and other constructions clearly fall within the scope of the invention, the gist of which is that the cutters are retracted consequential to the feed member moving downward relative to the cutter casing.

Another feature of my invention is the provision of a clutch, such as a bayonet-clutch, by means of which the feed stem can be brought, below the surface of the ground, into operative engagement with the feed member.

Still another important feature is the provision of a resilient vertically yielding connection between the cutting apparatus proper and the turn rod or, generally speaking, of a device interposed in the turn rod for avoiding excessive loads on the cutters from variations in the length of the said rod. In order to still further relieve the cutters of strains, I may provide for a special guide member associated with the casing and running in the groove cut, so as to wholly or partially take up the strains set up by the spring.

What I claim is:—

1. In apparatus for cutting pipes in well-holes, a casing, a turn rod from which said casing is suspended, a cutter adapted for substantially radial reciprocation in said casing, a feed member cooperating with said cutter to move it outward or inward when the said member moves upward or downward, respectively, relative to said casing, and a stem from which said feed member is suspended, said stem being provided with a coupling adapted to be closed below the surface of the ground while the said casing is suspended from its turn rod within the pipe to be cut.

2. In apparatus for cutting pipes in well-holes, a casing, a turn rod from which said casing is suspended by means providing for a certain amount of longitudinal motion of said casing relative to said turn rod, a spring interposed between said turn rod and said casing so as to yieldably counteract said relative movement, a cutter adapted for substantially radial reciprocation in said casing, and a feed member cooperating with said cutter to move it outward or inward when the said member moves upward or downward, respectively, relative to said casing.

In testimony whereof I affix my signature.

REINIER MEIJER.